May 21, 1968 — A. J. GIRARD — 3,383,978
APPARATUS FOR SPECTROMETRIC ANALYSIS OF RADIANT FLUX
Filed Nov. 16, 1964 — 6 Sheets-Sheet 1

André Jean Girard
INVENTOR.

BY Karl G. Ross
AGENT

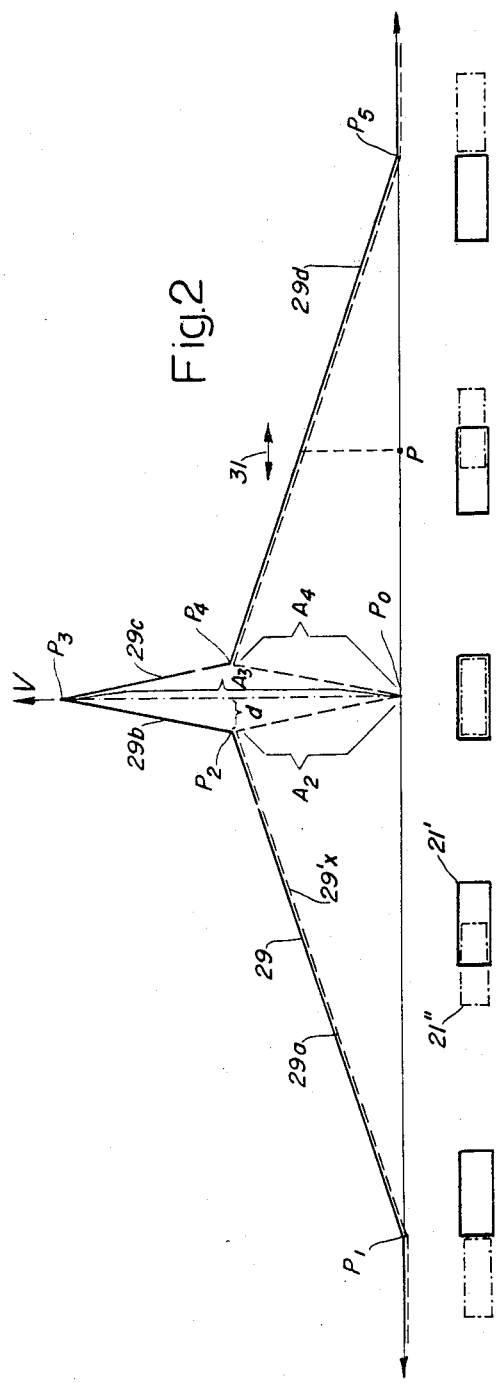
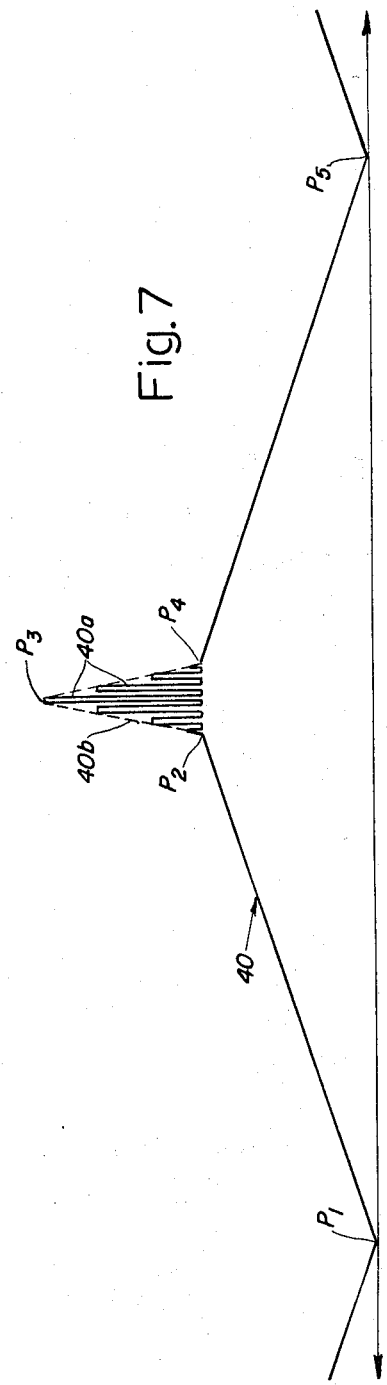

May 21, 1968 A. J. GIRARD 3,383,978
APPARATUS FOR SPECTROMETRIC ANALYSIS OF RADIANT FLUX
Filed Nov. 16, 1964 6 Sheets-Sheet 3
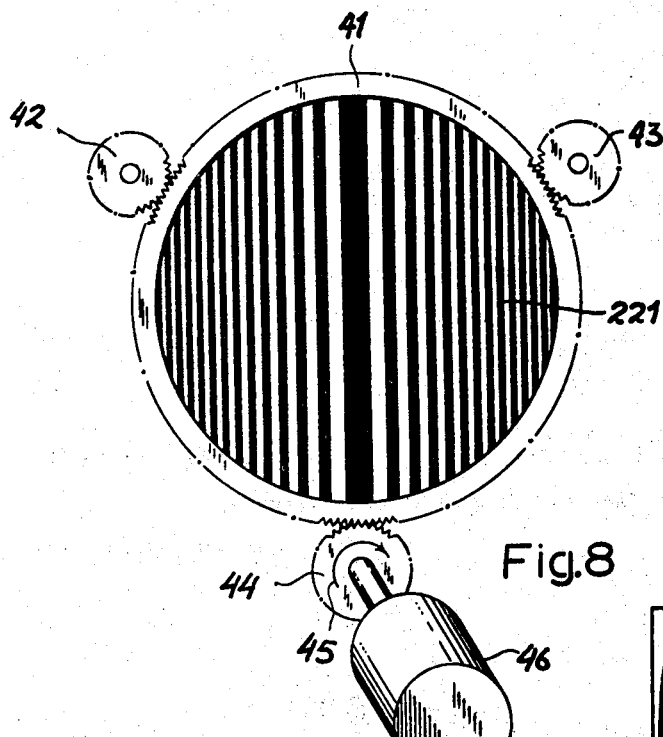
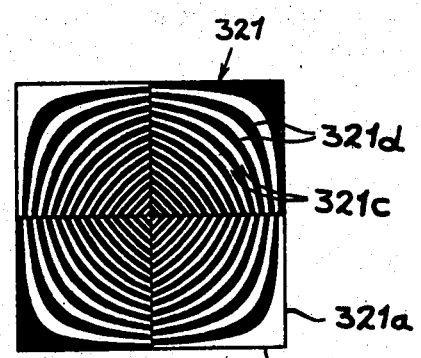
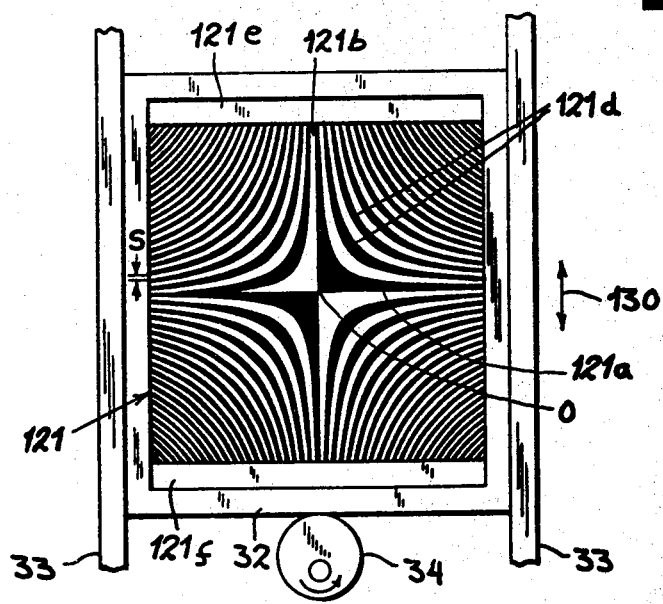
André Jean Girard
INVENTOR.
BY Karl F. Ross
AGENT

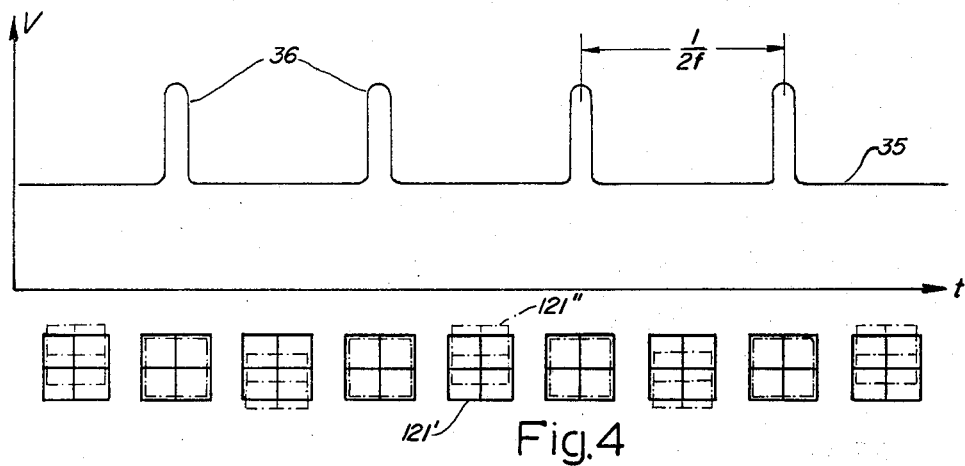
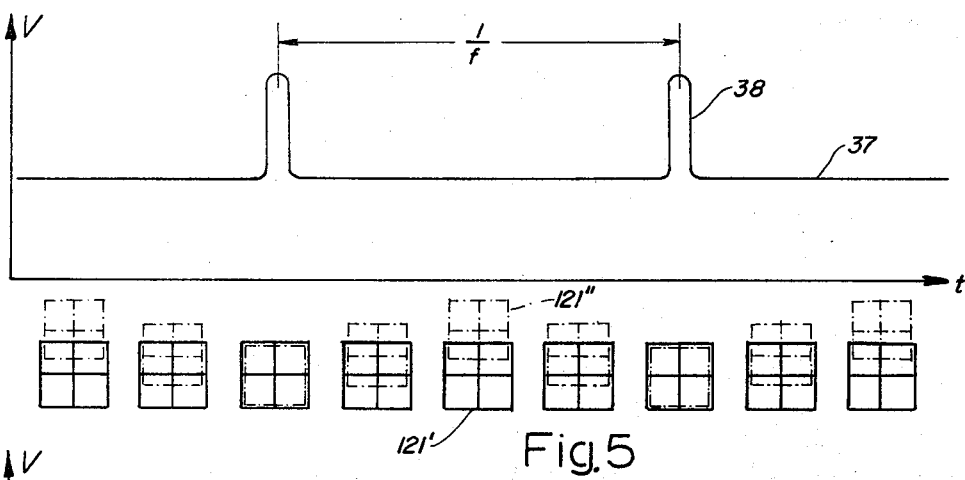
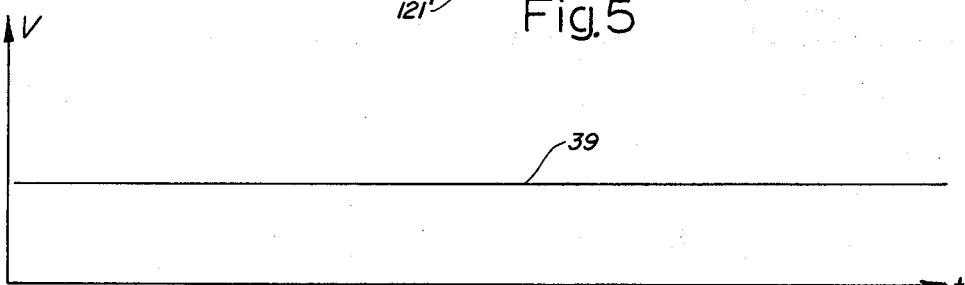

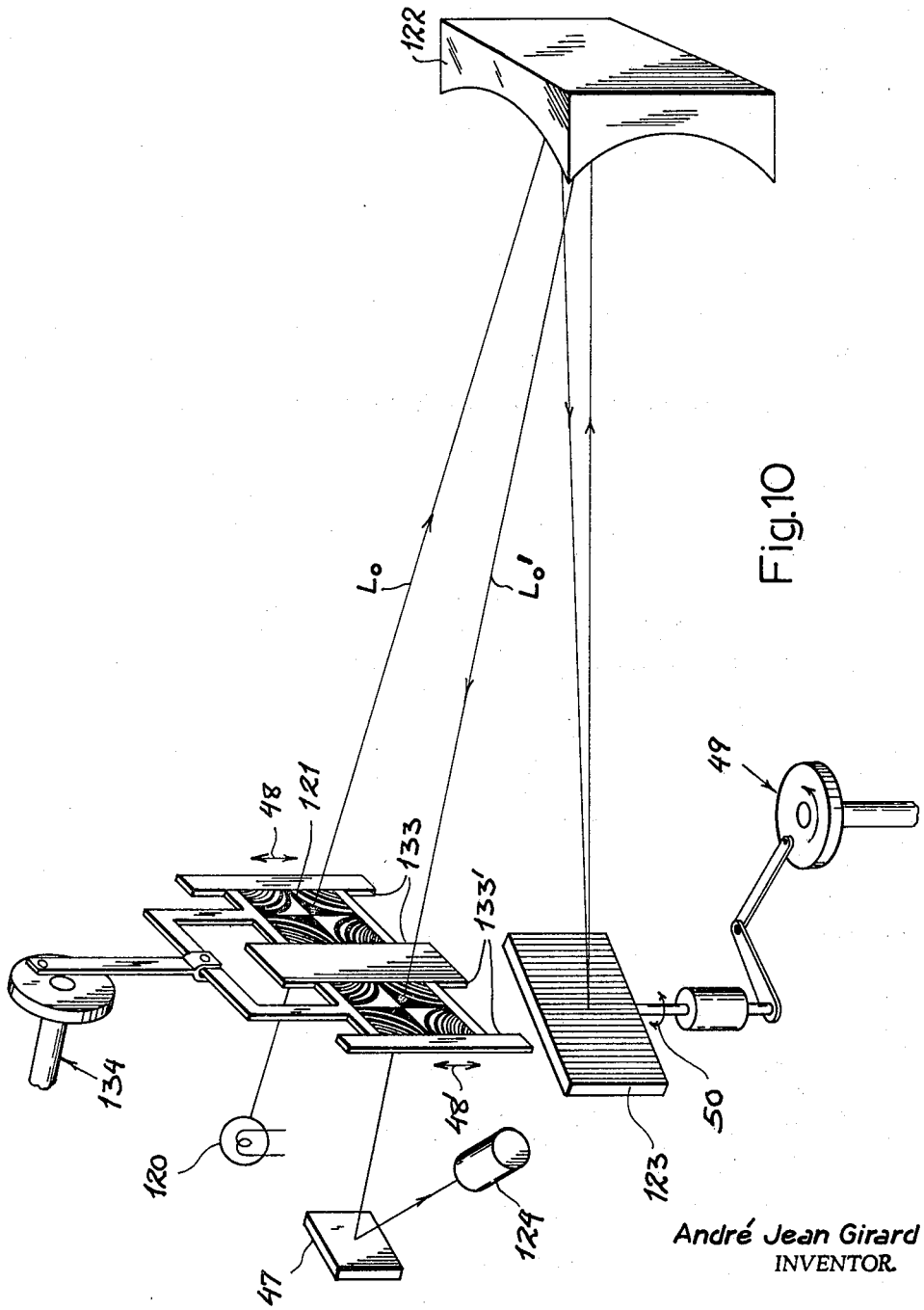

May 21, 1968   A. J. GIRARD   3,383,978
APPARATUS FOR SPECTROMETRIC ANALYSIS OF RADIANT FLUX
Filed Nov. 16, 1964   6 Sheets-Sheet 6
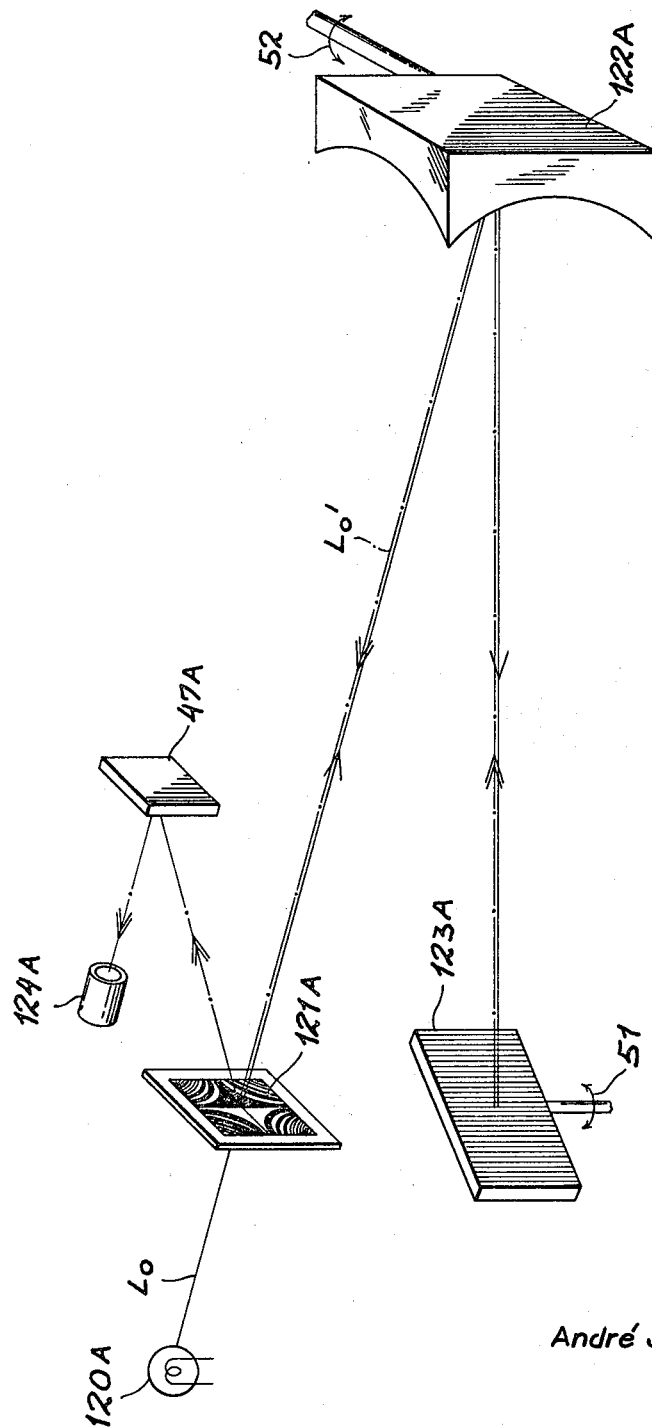
André Jean Girard
INVENTOR.
BY Karl F. Ross
AGENT

3,383,978
APPARATUS FOR SPECTROMETRIC ANALYSIS OF RADIANT FLUX

André Jean Girard, Chatillon-sous-Bagneux, France, assignor to Office National d'Etudes et de Recherches Aerospatiales, Chatillon-sous-Bagneux, France, a corporation of France
Filed Nov. 16, 1964, Ser. No. 411,254
Claims priority, application France, Nov. 14, 1963, 953,742
23 Claims. (Cl. 88—14)

My present invention relates to an apparatus for the spectrometric analysis of radiant flux as disclosed in my copending applications Ser. No. 31,690 filed May 25, 1960, now Patent Number 3,211,048, Ser. No. 175,911 filed Feb. 27, 1962, now Patent Number 3,343,446 and Ser. No. 186,812 filed Apr. 11, 1962, now Patent Number 3,311,015.

A feature of a spectrometric apparatus as disclosed in these earlier applications is the utilization, at its input and output sides, of a radiation gate having a pattern of zones alternately forming part of a first and second multiplicity, the zones of one multiplicity differing in their transmissivity for incident radiation from the zones of the other multiplicity. The term "transmissivity," as used here, denotes the ability to direct radiation from a source to a destination by either direct traversal or reflection; thus, the two sets of zones may respectively be relatively transparent and relatively opaque, relatively reflective and relatively nonreflective, or endowed with a combination of these properties. The pattern formed by the zones is non-repetitvie in at least one reference direction, this direction lying in the optically effective plane of a dispersion means (e.g. a prism or a diffraction grating) forming part of an associated optical system which focuses the image of the input-side pattern upon the geometrically similar output-side pattern in the presence of radiation of a particular wavelength for which the dispersion means is correspondingly adjusted; if the operating wavelength departs from the adjustment wavelength determined by the setting of the dispersion means, the projected image of the input-side pattern registers with the output-side pattern only partially or not at all. The relative dimensioning of the two patterns is so chosen that the projected image of the input pattern is coextensive with the output pattern, as by making the two patterns identical in size where the projection system has a magnification ratio of unity. Thus, in the coincidence position each zone of the projected image will register exactly with a corresponding zone of the output pattern whereby the entire radiant flux passed by the input gate will be either completely transmitted or completely blocked by the output gate, depending on whether corresponding zones of the two patterns are optically similar (i.e. either transmissive or nontransmissive) or complementary. In either case, radiant flux transmitted on wavelengths other than the adjustment wavelength will partly clear the two gates so that the output of a photoelectric transducer, positioned to receive the transmitted radiation, will have a finite amplitude in all positions of partial coincidence. This finite amplitude will be observable either over a wide range of wavelengths of incident flux, applied successively to the spectrometer input, or throughout a wide range of positions of the dispersion device if the latter is swung in its optically effective plane to scan a band of the spectrum containing the wavelength of a monochromatic flux transmitted by the apparatus.

If the output of the photoelectric transducer is plotted against the relative optical positions of the two patterns (i.e. the degree of offset of the projected image of the input pattern from the output pattern) in the case of such scanning displacement, the amplitude of that output will be zero as long as there is no coincidence at all. Upon beginning coincidence this amplitude starts to rise approximately linearly up to an off-position approaching full coincidence; the spacing of this off-position from the coincidence position may be termed a slit width by analogy with a conventional single-slit spectrometer having the same power of resolution. As explained in my earlier applications, such equivalent slit spectrometers inherently have a ratio of transmitted to incident radiation which is only a small fraction of that provided by the improved spectrometer described above. If the gate pattern consists, for example, of generally rectangular zones whose width varies progressively in the aforementioned reference direction, as disclosed in my application Ser. No. 31,690, the slit width is represented by the width of the narrowest zone of the input pattern. Since the width ratio from the widest to the narrowest zone may be of the order of 100:1, the increase in flux transmission as compared with a conventional single-slit spectrometer of like resolving power will be readily apparent.

When scanning (or an equivalent frequency change) progresses from the aforementioned off-position to the central position of exact registry, the amplitude of the output signal rises sharply to a peak (in the case of optically similar patterns) or drops equally sharply to substantially zero (in the case of optically complementary patterns). Beyond that centered position the signal will follow a curve which is symmetrical to that already described, i.e. which has a steep ascending or descending slope up to another off-position and thereafter drops gradually to zero. If the cumulative area of one set of zone is equal to that of the other, the gently sloping portion of the curve will have approximately the same shape whether the patterns are optically identical or complementary, i.e. the amplitude in the off-positions will be half the peak amplitude attained in the centered position with optically identical patterns.

The property just described has been utilized heretofore, in connection with the spectrometers disclosed in my earlier applications, to isolate the sharply sloping central portion of the output signal from the remainder of the curve by differentially combining the energies of two partial fluxes transmitted, either alternately or concurrently, over two optically distinct paths, i.e. a first path with optically identical input and output patterns and a second path with mutually complementary patterns. The final signal is then a narrow triangular pulse occurring whenever the coincidence condition is satisfied, i.e. when the wavelength of incident radiation passes through a value corresponding to the position of the dispersion device or whenever the dispersion device is moved through a position of adjustment corresponding to the existing wavelength; since, however, the slightly inclined outer flanks of the two curves cancel only imperfectly, some secondary peaks will appear on opposite sides of the main peak of the composite scanning curve.

In many instances, the need for providing separate flux paths represents an undesirable complication requiring not only a duplications of parts but also a high degree of conformity between corresponding components, e.g. in the design of the gate patterns and in the performance characteristic of the respective photoelectric transducers. Where a single photocell is used to receive the radiation alternately transmitted over the two paths, special switching and signal-storing means must be provided.

It is, therefore, the general object of my present invention to obviate the need for differential signal combination in the output of a spectrometer of the type described above.

More specifically, it is an object of this invention to provide means for effectively isolating the steeply sloping triangular pulse portion in the output signal of a one-path spectrometer of this character with suppression of the gently sloping flanks of its scanning curve.

If the flux transmitted over a single spectrometric path were converted directly into an electrical signal, with the dispersion device held in a position of adjustment corresponding to a desired wavelength of incident radition, it would not be possible unequivocally to detect the presence of such wavelength if the frequency of the flux did not change; thus, in the case of identical patterns the signal amplitude would be finite in positions of both partial and complete coincidence, whereas with complementary patterns this amplitude would be zero in the case of complete coincidence and noncoincidence.

The foregoing objects are realized, in accordance with my present invention, by the provision of drive means for periodically displacing a gate-carrying support relatively to the associated projection system, in a direction in which the gate pattern is nonrepetitive, to produce an output signal which periodically reaches an extreme value (maximum or near-zero minimum) in the presence of radiant energy carried on the adjustment wavelength but which will fluctuate only slightly, or practically not at all, if such radiation is absent; means are provided for detecting, in the output of the photoelectric transducer, the sharp pulse which indicates the presence of the desired radiation and which recurs periodically, as long as this radiation continues, at a frequency determined by the periodicity of the discriminating displacement. The latter may be either oscillatory (along a straight line or an arc) or continuously rotatory; if the displacement is one of vibration, the recurrence rate of the signal pulse will eqqual the oscillating frequency or be twice that frequency, depending on whether the coincidence position lies at a limit of the displacement stroke or at an intermediate portion thereof.

The driving mechanism effecting the aforedescribed relative displacement may be coupled with either the gate support or some element of the projection system, such as a collimator. In general, a vibratory displacement with a limited amplitude (e.g. on the order of the effective slit width) will be sufficient to cause an appreciable flux variation by the periodic shifting between positions of complete and partial coincidence. If the adjustment wavelength is missing in the spectrum of incident radiation, the shift will occur only between positions of partial coincidence with consequent alternation between almost equal amplitudes along the gently sloping portion of the scanning curve, or between positions of noncoincidence with uniform zero output.

Since the periodic discriminating displacement must carry the two patterns from a position of alignment to a position of nonalignment and vice versa, it must take place in a direction other than one parallel to the zone boundaries if the zones of the patterns are rectangles or trapezoids separated by parallel lines. Moreover, if the dispersion device is to be subjected to a scanning movement in a plane parallel to the reference direction of the patterns, i.e. a direction perpendicular to the zone boundaries in the case of rectangular zones, the discriminating displacement is advantageously a rotary motion in order to be readily distinguishable from the scanning displacement. Even without such frequency scanning, it is essential (at least in the presence of polychromatic radiation) that the discriminating displacement should not lead to an apparent shift in the spectrum whereby a wavelength other than the one selected by the adjustment of the dispersion means would give rise to a coincidence signal; thus, except in specific instances in which there is no danger of such spurious signals, the discriminating movement—if a translational vibration—should not be parallel to the spectrum-spread plane. Of particular advantage in this connection is a pattern which is non-repetitive in two orthogonally related directions, such as a pattern of equilaterally hyperboloidal curves with a common axis and common asymptotes as disclosed in my application Ser. No. 175,911; in that case the discriminating displacement may be a vibration in one of these directions (i.e. parallel to one common asymptote) while the scanning displacement occurs in the other direction (parallel to the other common asymptote). In order that a train of recurring signal pulses may be developed in response to radiation of a wavelength within the operative band, the scanning displacement should occur at a considerably slower rate than the discriminating displacement; thus, the frequency of the discriminating vibration may correspond to about 1000 or more times the scanning frequency.

The spectrometric apparatus according to my present invention requires only two patterns, one on the input side and one on the output side, one of which may be readily derived from the other with absolute fidelity by photographic reproduction, through the optical projection system of the apparatus itself, with the aid of a monochromatic radiation passing therethrough. This mode of duplication insures that the image of the input gate will register precisely, zone for zone, with the output gate in the adjustment position of the system, regardless of the magnification ratio of the system.

My present improvement, however, can also be realized with a single gate carrying both the input-side and the output side pattern, both patterns being constituted by sections of alternately high and low transmissivity forming part of a single plate member positioned ahead of an optical system which includes both a reflector and an autocollimator to reproject the incident radiation, after passage through the dispersion means, upon the same plate member which originally transmitted this radiation to the optical system; the input-side pattern is then formed on the side of the plate member facing away from the projection system whereas the output-side pattern is present on the side turned toward that system. Thus, one set of plate sections may in this case be transparent, the other set being opaque but reflective at least on the side facing the projection system; the outgoing radiation reflected by these latter sections is then directed toward the photoelectric receiver. The dispersion means of such spectrometer is advantageously constituted as a reflection grating so as to obviate the need for a separate reflecting element.

Since the projection system just described will reverse the angle of inclination of the incoming and outgoing rays, a pattern suitable for use in a single-gate spectrometer should be composed of centrally symmetrical sectors; again, a hyperboloidal pattern of the type disclosed in my application Ser. No. 175,911 will be highly suitable since its area is divided into quadrants with geometrically identical arrays of hyperboloidal curves in each quadrant, these arrays being symmetrically oriented with reference to a central point. The latter point may be the intersection of the common asymptotes of the curves of all quadrants; yet it is also possible, and in some cases advantageous, to reverse the arrays of the individual quadrants so that their respective asymptotes, common to all the curves of the array, intersect at the corners of a rectangle (specifically a square) centered on the point of symmetry, with the relative spacing of the curves of each array decreasing progressively along a diagonal line from the corner of the quadrant inwardly. If corresponding zones of diametrically opposite quadrants are optically equivalent, as by being respectively transparent and reflective (thus both transmissive of impinging radiation in the sense defined above), the output signal will reach a peak for the adjustment wavelength; if they are optically opposite, as being both transparent or both opaque, substantially no radiation of that wavelength will reach the receiver so that the output signal will be zero in the coincidence position. It will thus be seen that, in this particular instance, optical equivalence does not correspond to identical physical properties.

The above and other features of my invention will become more fully apparent from the following detailed description, reference being made to the accompanying drawing in which:

FIG. 2 is a graph representing a scanning curve as obtained with the apparatus of FIG. 1 but without the present improvement;

FIG. 3 is a face view of a radiation gate adapted to be used in the apparatus of FIG. 1;

FIGS. 4, 5 and 6 are graphs illustrating the mode of operation of the system of FIG. 1 with a vibratile gate of the type shown in FIG. 3;

FIG. 7 is a graph similar to FIG. 2, showing the scanning curve of the spectrometer as modified by the present improvement;

FIG. 8 is a face view of a different radiation gate adapted to be used in the spectrometer according to the invention;

FIG. 9 shows still another gate pattern for use with my improved spectrometer;

FIG. 10 diagrammatically illustrates another type of spectrometer embodying the invention;

FIG. 11 is a view similar to FIG. 10, illustrating a further embodiment; and

Figure 12:
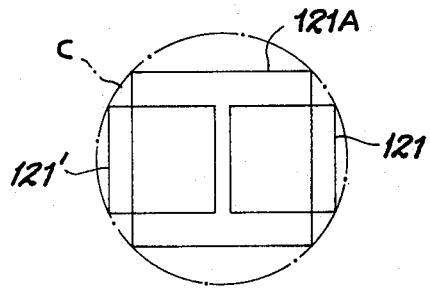

FIG. 12 is a diagram showing the relative proportioning of the gate patterns in the systems of FIGS. 10 and 11.

Figure 1:
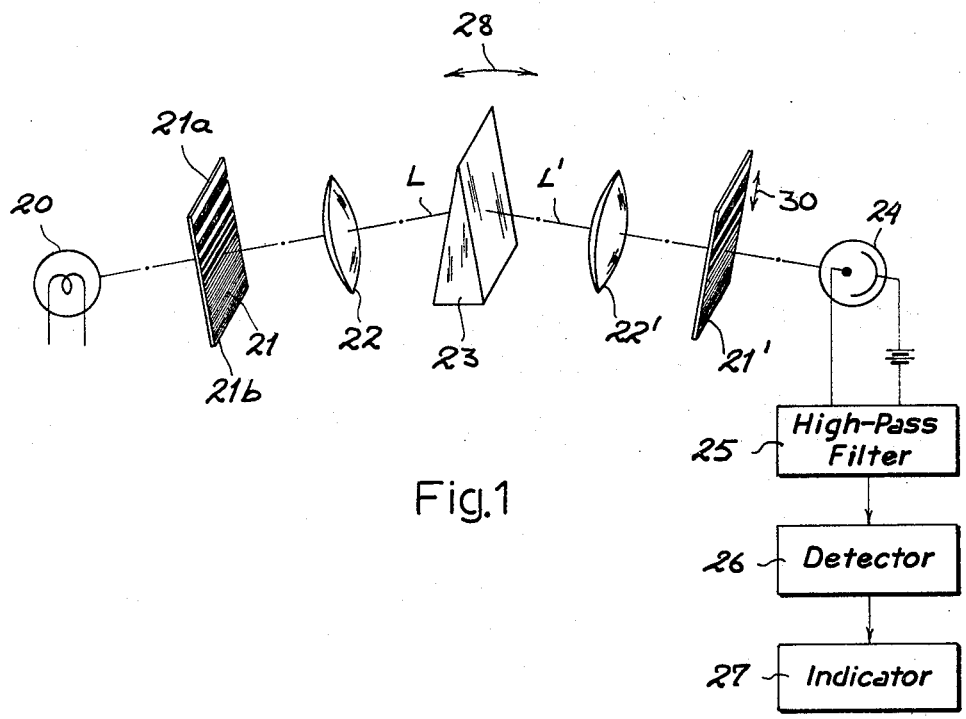
FIG. 1 is a diagrammatic view of a spectrometric apparatus embodying the invention.

Reference will first be made to FIG. 1, which shows a spectrometer comprising a source of radiant energy illustrated schematically as a lamp 20; an input gate 21 transluminated by the light rays L from source 20; an input collimator shown diagrammatically as a lens 22; a dispersion device, illustrated as a prism 23; an output collimator shown diagrammatically as another lens 22'; an output gate 21' transluminated by dispersed rays of light L' focused upon it by the collimator 22'; a photoelectric cell 24 positioned to receive the rays L' which traverse the gate 21'; and an output circuit for the photocell 24, including a high-pass filter 25, a detector 26 and a visual or other type of signal indicator 27.

The radiation gates 21 and 21' are each shown composed of alternately transparent and opaque zones whose boundary lines are perpendicular to the spectrum-spread plane of the prism 23. The spacing of these boundary lines within that plane, and thus the width of the rectangular zones, varies progessively from the center of the pattern outwardly and in this particular instance decreases according to a nonlinear law from one side $21a$ to the opposite side $21b$ of the rectangular pattern (as specifically indicated for the input gate 21).

The nonlinear law referred to, as disclosed in my application Ser. No. 31,690, may be a hyperbolic one according to which, at least in a first approximation, the width of each zone is inversely proportional to the distance of its remote boundary line from the edge $21a$.

It will be assumed that the magnification ratio of the projection system 22, 23, 22' equals unity and that the patterns oif the two gates 21, 21' are geometrically and optically identical. If the projected image of gate 21 actually coincides with the pattern of gate 21', which will be true for only one wavelength in a given position of prism 23, all the flux of monochromatic light traversing the transparent zones of input gate 21 (thus approximately half the flux incident upon that gate) will also clear the transparent zones of output gate 21' to energize the photocell 24''; for any other wavelength, and therefore also for any other position of prism 23 with the same wavelength, the flow of luminous energy to the photocell will be sharply reduced or completely discontinued. Thus, if the light from source 20 is monochromatic and if the prism is swung in its optically effective plane, as indicated by arrow 28, the output voltage of photocell 24 follows a scanning curve 29 as shown in FIG. 2 (full lines) for the various relative positions of the output gate 21' and the projected image 21'' of input gate 21 as indicated below curve 29 in FIG. 2; for the sake of clarity the outline of image 21'' has been shown slightly smaller than that of the pattern 21'.

Curve 29 has a gently sloping branch $29a$ (shown idealized as a straight line) which rises from zero at a position $P_1$, in which the patterns 21' and 21'' barely touch, to a position $P_2$ in which these patterns are nearly but not quite coincident; the curve then ascends steeply along a flank $29b$ of a triangular pulse whose apex $P_3$ represents the position of exact registry of the two patterns. The curve then continues symmetrically with a steep descending flank $29c$ to a position $P_4$ and thereafter with a gently sloping branch $29d$ to a position $P_5$ where its amplitude returns to zero.

The distance of the two off-positions $P_2$ and $P_4$ from the central position $P_3$ is a small fraction of the length of the pattern in the direction of scan and corresponds, in fact, to the width of the narrowest zone of the pattern, i.e. the zone closest to line $21b$ in FIG. 1. This distance may thus be termed the effective slit width of the spectrometer. Furthermore, the amplitude $A_2$, $A_4$ of curve 29 at points $P_2$ and $P_4$ equals substantially half the amplitude $A_3$ at point $P_3$.

If either of the two gates 21, 21' were replaced by a geometrically identical but optically complementary gate, the scanning curve in FIG. 2 would have the configuration indicated in dotted lines at $29x$, this curve in its idealized shape following closely the curve 29 between points $P_1$ and $P_2$ as well as between points $P_4$ and $P_5$. In the coincidence position represented by point $P_3$ on curve 29, however, curve $29x$ drops sharply to a point $P_0$ along the abscissa so as to give rise to a sharp pulse $P_2$—$P_0$—$P_4$ which is the negative of the pulse $P_2$—$P_3$—$P_4$ of curve 29.

I shall now describe the way in which one or the other of these pulses is isolated from the remainder of the respective curve in an apparatus according to the present invention.

Let it be assumed that one of the gates in the spectrometer of FIG. 1, e.g., the output gate 21', is periodically displaced with reference to the optical system 22, 23, 22', as by being vibrated in the direction of arrow 30. Such vibration will have the effect, with the incident wavelength and the position of prism 23 left unchanged, of altering the degree of coincidence between patterns 21' and 21'' in FIG. 2 so as to shift the curve 29 (or $29x$) in FIG. 2 with reference to a point on the abscissa representing the actual position of the prism. If this point is located along one of the gently sloping curve portions $29a$ and $29d$, e.g., as shown for the point P, the shift indicated by arrow 31 will cause only a minor change in amplitude so that the output voltage of photocell 24 will barely fluctuate. If the point P were located beyond the curve (to the left of position $P_1$ or to the right of position $P_5$), the photocell output would remain constant at zero. If, however, point P were in the vicinity of position $P_3$, the output voltage would vary rapidly along the steep flank $29b$ or $29c$ so that a sharp pulse would be produced; the same would be true in the region of point $P_0$ of curve $29x$. This will be further described with reference to a modified gate pattern as illustrated in FIG. 3 since, as noted above, a translational displacement in the optically effective plane of the dispersive element 23 (as indicated by arrow 30 of FIG. 1) is undesirable in any situation in which confusion may arise from a shifting of the operative frequency range represented by the curves of FIG. 2.

The gate 121 shown in FIG. 3 has a square area divided into four quadrants by two intersecting median lines $121a$, $121b$ which are the common asymptotes of four families of equilaterally hyperbolical curves defining alternately transparent and opaque zones $121c$, $121d$ in each of these quadrants. The arrays of curves in the four quadrants are symmetrical about the center O of the gate pattern, the spacing of successive curves within this quadrant decreasing progressively from the center O outwardly along one of the diagonals of the square. Any line parallel to one of the two asymptotes 121a, 121b, however, intercepts successive curves along points of intersection having the same mutual spacing, this spacing having its minimum value s along the sides of the square; the distance s has the same function as the width of the narrowest zone in the pattern of FIG. 1, being thus a measure of the effective slit width.

The hyperbolical gate pattern 121, representative of a type of such patterns described in my application Ser. No. 175,911, is nonrepetitive in both orthogonal directions and is shown mounted for vibration, according to arrow 130, parallel to its median line 121b, it being assumed that the spectrum-spread plane of the associated prism or other dispersion element is parallel to the other median 121a. To facilitate such vibration, the flat plate constituting gate 121 is mounted in a frame 32 which is slidably between rails 33 under the control of a continuously rotating cam 34; it will be understood that this cam is representative of any conventional drive means for bringing about such periodic motion.

The vibration represented by arrow 130 may have an amplitude upwardly to about half the slit width s, a convenient upper limit being a value of about 2s since beyond this value only an increased pulse spacing but no appreciable improvement in pulse definition will be realized. Thus, each side of the square pattern 121 may have in practice of length of, say, 30 mm., with a slit width s equal to 0.1 mm.; the amplitude of vibration may then range between 0.05 and 0.2 mm. Opaque strips 121e and 121f, of a width equaling or exceeding this vibration amplitude, may be provided along opposite sides on both the input and the output pattern to obstruct the passage of stray radiation in the relatively offset positions of the two patterns; this is particularly important if the frame 32 is omitted. Similar masking means, not shown, may of course be used to prevent the passage of spurious light rays upon a lateral scanning displacement of the image of the input pattern with reference to the output pattern.

In FIGS. 4–6 I have indicated at 121′, 121″ the outline of the output pattern and the projected image of the input pattern, respectively, for a succession of vibratory cycles. FIG. 4 illustrates the situation in which the coincidence position occurs at the midpoint of the displacement stroke, this position being thus encountered twice per cycle so that the curve 35 of the output voltage V, plotted against time t for a constant monochromatic flux and a fixed prism position, exhibits a train of sharp pulses 36 recurring at twice the vibration frequency. In FIG. 5 I have shown a similar curve 37 whose pulses 38, however, occur only once per cycle of vibration since the coincidence position lies at one of the limits of the displacement stroke. In FIG. 6, finally, the patterns 121′, 121″ are laterally offset by a fixed distance D greater than d (FIG. 2), hence these patterns overlap only partially throughout the cycle so that no coincidence position exists and the curve 39 remains substantially flat. The high-pass filter 25 in FIG. 1 effectively eliminates the direct-current component of the curve 35 or 37 so as to pass only the pulses 36 or 38; these pulses are then integrated in the detector 26 to control the indicator 27. The filtering network 25 may include, for example, an amplifier or other circuit component tuned to the vibration frequency $f$.

FIG. 7 illustrates the effect of a combination of a discriminating vibration (arrow 130, FIG. 2) with a periodic scanning sweep (arrow 28, FIG. 1) upon the output voltage of photocell 24. The scanning frequency is considerably lower than the vibration frequency and is advantageously so chosen that a limited number of signal pulses occur during the scanning of a distance $2d$ equal to the spacing between positions $P_2$ and $P_4$ in FIG. 2. If the pattern has the specific dimensions given above, i.e., with the length of a scanning stroke from $P_1$ to $P_5$ measuring 60 mm. and the distance $2d=2s=0.2$ mm., the latter distance will be swept in a few thousandths of a scanning period (depending on whether the scanning speed is substantially linear or varies harmonically) so that the vibration frequency will be on the order of a thousand times the scanning frequency if, say, between five and ten signal pulses are to come into being during the sweep of the pulse base $P_2$–$P_4$. Thus the voltage curve 40 shown in FIG. 7, repeated periodically, is generally similar to curve 29 of FIG. 2 in the regions $P_2$–$P_4$ and $P_4$–$P_5$, where the transverse high-frequency vibration introduces substantially no amplitude variations, but changes into a train of pulses 40a in the region $P_2$–$P_4$, these pulses corresponding to those shown at 36 and 38 in FIGS. 4 and 5 but being amplitude-modulated in conformity with the steep flanks of curve 29 (FIG. 2) so that the envelope 40b thereof is of triangular shape with a peak at $P_3$.

Again, the filter 25 shown in FIG. 1, designed to suppress not only the D-C component of curve 40 but also the frequency of its scanning sweep, will isolate the pulses 40a for integration in the detector 26.

FIG. 8 illustrates the possibility of utilizing a rotary rather than a linear motion as the discriminating displacement. More specifically, the pattern 221 shown in FIG. 8 is of the same general type as the pattern 21, 21′ of FIG. 1, i.e. with generally rectangular zones separated by parallel boundaries whose spacing varies progressively according to a nonlinear law, except that the pattern is symmetrically duplicated on opposite sides of a diameter of its circular outline. The disk constituting the physical carrier of pattern 221 is framed by a ring gear 41 journaled between two idler pinions 42, 43 and a driving gear 44, the latter being unidirectionally rotated (as shown by arrow 45) by a motor 46. This rotation, however, need not be at constant speed but may be advantageously so stepped, e.g. with the aid of a Geneva-type coupling, that the pattern 221 dwells in or near its illustrated position (assumed to be the position of alignment with the other pattern) over an extended part of a cycle and swings through an angle of 180° at an accelerated rate; this will reduce the spacing of the coincidence pulses with reference to the pulse width so that a pulse train similar to that shown at 40a in FIG. 7 will be produced thereby.

Naturally, the pattern 221 could also be merely oscillated about its axis, an oscillating amplitude with an arc length of about 10 min. having been found satisfactory.

FIG. 9 shows a pattern 321 which differs from pattern 121 (FIG. 3) in that the arrays of the individual quadrants have been reversed so that the zones 321c, 321d of each array decrease in width from the corners of the square inwardly toward the center of the pattern. The asymptotes, such as those indicated at 321a and 321b, are individual to the family of curves of each quadrant and intersect at respective corners of the square. An advantage of this type of pattern is that the narrowest zone width occur at locations closer to the center of the pattern, thus reducing the effect of optical aberrations of the projection system upon the performance of the apparatus.

FIG. 10 shows a modified spectrometer with a light source 120, an input gate 121 of the type shown in FIG. 3, a collimator 122 in the form of a concave mirror, a dispersion element constituted by a reflecting grating 123, an output gate 121′ identical with input gate 121, a plane mirror 47 beyond gate 121′ and a photoelectric transducer 124 working into an output circuit not further illustrated. Gates 121, 121′ are guided between rails 133, 133′ and have a common support 132 vibrated in the direction of arrows 48, 48′ by a driving mechanism 134. Another driving mechanism 49 periodically swings the grating 123 about a vertical axis as indicated by the arrow 50.

The grating 123, in the mid-position of its swing, directs a monochromatic central light ray $L_0$ of the desired adjustment wavelength from collimator 122 back toward that collimator and thence to the center of output gate 121′, as illustrated at $L_0'$. Slanting rays of the same wavelength are similarly reflected but with reversal of their angle of incidence, hence they impinge upon zones of gate 121' which are diametrically opposite with reference to the zones of gate 121 through which they passed originally.

Since diametrically opposite quadrants of both patterns are optically alike and since the two gates are identical, the output of photocell 124 will conform to curve 29 of FIG. 2 if the vibrator 134 is deactivated. When this vibrator is set in motion, the conditions explained with reference to FIG. 7 will obtain.

The driving mechanism 134 of FIG. 10 could, of course, be coupled with one of the gates 121, 121', the other gate being held stationary; the joint vibration of both gates, however, increases the effective stroke length of the vibration motion so that a given degree of periodic disalignment may be obtained with only half the amplitude of physical displacement.

In FIG. 11 I have illustrated a simplified spectrometer using but a single gate member 121A in combination with an optical system generally similar to that of FIG. 10, this system comprising a collimating mirror 122A and a grating 123A as well as a plane mirror 47A and a photoelectric receiver 124A. Mirror 122A operates as an auto-collimator, a monochromatic ray $L_0$ from source 120A being reflected back upon itself (as shown at $L_0'$) by both the mirror 122A and the grating 123A when the latter is at the proper angle corresponding to its adjustment position for that particular wavelength. Arrow 51 indicates the periodic scanning sweep of grating 123A, under the control of a drive mechanism similar to that shown in FIG. 10, the mirror 122A being similarly swingable, but at a higher frequency and within a plane perpendicular to the spectrum-spread plane of the grating, as indicated by arrow 52. The latter motion takes the place of a direct vibration of the gate as illustrated in FIGS. 1, 3 and 10.

The rear face of gate member 121A, visible in the drawing and turned toward the optical system 122A, 123A, bears an output pattern constituted by alternately reflective and nonreflective surfaces of respective transparent and opaque sections into which the plate 121A is divided; the front face of this plate constitutes the corresponding input pattern, represented by the opposite surfaces of these sections, and is inherently of identical configuration. The plate 121A is slightly inclined with reference to the perpendicular to the central ray $L_0$ so that the impinging rays of the outgoing beam may be reflected toward mirror 47A.

The pattern of gate 121A is distinguished from that of gates 121, 121' in that diagonally opposite zones are physically different from each other, i.e. an opaque zone in one quadrant corresponds to a transparent zone in the diagonally opposite quadrant and vice versa. As explained before, however, the transparent zones of the input pattern are here optically equivalent to the opaque zones of the output pattern since the latter, being reflective, also transmit the incident radiation. Thus, with the arrangement of FIG. 11 the output of photocell 124 will again follow the curve 29 of FIG. 2; if a pattern similar to that of gate 121 were substituted, the output voltage would correspond to curve $29x$.

Naturally, a pattern such as that shown at 329 in FIG. 9 could be used in both the apparatus of FIG. 10 and that of FIG. 11.

The relative vibration of the gate 121A and the mirror 122A, whether obtained through a direct driving of the former or the latter, has the same effect as the joint displacement of the two gates 121, 121' relative to mirror 122 as described in connection with FIG. 10, i.e. the amplitude of vibration will be half that required with equivalent displacement of a single gate.

Besides eliminating the need for a second gate member through the use of the auto-collimation principle, the apparatus of FIG. 11 also has optical advantages compared with a two-gate apparatus of the type shown in FIG. 10. Thus, I have indicated at C in FIG. 12 an imaginary circle representing the boundary of a region within which the aberrations of an associated projection system are of tolerable magnitude; it will be seen that two juxtaposed gate patterns 121, 121', fitted inside this circle, are substantially smaller than a single gate pattern 121A inscribed therein. Thus, a larger gate surface with consequently increased luminosity can be used, under otherwise equal conditions, with the auto-collimating system illustrated in FIG. 11.

My invention is, of course, not limited to the specific type of pattern shown by way of example, nor to the particular constructive solutions disclosed; thus, the various modes of operation described in connection with certain embodiments may be used, individually or in compatible combinations, with other embodiments, as for example by the positioning of two gates of the type shown at 121, 121' on opposite sides of a dispersive prism in lieu of the gates 21, 21' of FIG. 1. Also, if desired, the grating 123 or 123A could be continuously rotated instead of oscillated about its axis. These and other modifications, readily apparent to persons skilled in the art, are intended to be embraced within the spirit and scope of my invention except as otherwise limited by the appended claims.

I claim:

1. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in at least one reference direction; a projection system for directing incident radiation, transmitted by the zones of one multiplicity of the input-side pattern, onto the output-side pattern of said gate means, said system including dispersion means with a spectrum-spread plane parallel to said direction for casting upon said output-side pattern an exactly registering image of said input-side pattern as projected with a predetermined wavelength of incident radiation; photoelectric transducer means positioned to receive radiation transmitted by one multiplicity of zones of said output-side pattern, the rate of reception of radiant energy by said transducer means attaining an extreme value for said predetermined wavelength and having finite other values for all other wavelengths projected with partial coincidence of said patterns; drive means for periodically displacing the projected image of said input-side pattern relatively to said output-side pattern between positions of exact and partial coincidence by relatively moving said support and at least part of said projection system whereby said rate of reception periodically reaches said extreme value in the presence of radiation of said predetermined wavelength; and circuit means connected to said transducer means for detecting a pulse corresponding to said extreme value in the output of said transducer means.

2. An apparatus as defined in claim 1 wherein said zones are bounded by substantially hyperboloidal curves having a common axis and common asymptotes, the spacing of said curves varying progressively along said axis, said drive means comprising mechanism for imparting relative translational displacement to said support and said system in a direction substantially parallel to one of said asymptotes.

3. An apparatus as defined in claim 1 wherein said zones are bounded by substantially straight lines whose spacing varies progressively according to a nonlinear law, said drive means comprising mechanism for imparting relative rotational displacement to said support and said system about a point located substantially at the center of said pattern.

4. An apparatus as defined in claim 1 wherein said radiation-gate means comprises a first plate member bearing said input-side pattern and a second plate member bearing said output-side pattern, said support being coupled with said drive means and carrying one of said members.

5. An apparatus as defined in claim 1 wherein said projection system includes reflector means for said radiation, said input-side and output-side patterns being closely juxtaposed on one side of said system.

6. An apparatus as defined in claim 5 wherein said dispersion means comprises a reflection grating forming part of said reflector means.

7. An apparatus as defined in claim 5 wherein said radiation-gate means comprises a first and a second plate member closely juxtaposed on said support, said first member bearing said input-side pattern, said second member bearing said output-side pattern, said support being coupled with said drive means.

8. An apparatus as defined in claim 5 wherein said projection system includes auto-collimator means for said radiation, said radiation-gate means comprising a single plate member divided into sections which form the zones of said input-side pattern on the side of said member facing away from said system and which form the zones of said output-side pattern on the side of said member turned toward said system, the pattern of said sections being centrally symmetrical.

9. An apparatus as defined in claim 10 wherein said plate member is coupled with said drive means through the intermediary of said support.

10. An apparatus as defined in claim 1 wherein said projection system includes collimator means coupled with said drive means for displacement relative to said support and said dispersion means.

11. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in at least one reference direction; a projection system for directing incident radiation, transmitted by the zones of one multiplicity of the input-side pattern, onto the output-side pattern of said gate means, said system including dispersion means with a spectrum-spread plane parallel to said direction for casting upon said output-side pattern an exactly registering image of said input-side pattern as projected with a predetermined wavelength of incident radiation; photoelectric transducer means positioned to receive radiation transmitted by one multiplicity of zones of said output-side pattern, the rate of reception of radiant energy by said transducer means attaining an extreme value for said predetermined wavelength and having finite other values for all other wavelengths projected with partial coincidence of said patterns; drive means for relatively vibrating said support and at least part of said projection system in a direction other than said reference direction between positions of exact and partial coincidence of said output-side pattern with the projected image of said input-side pattern whereby said rate of reception periodically reaches said extreme value in the presence of radiation of said predetermined wavelength; and circuit means connected to said transducer means for detecting a pulse corresponding to said extreme value in the output of said transducer means.

12. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in two orthogonally related directions; a projection system for directing incident radiation, transmitted by the zones of one multiplicity of the input-side pattern, onto the output-side pattern of said gate means, said system including dispersion means with a spectrum-spread plane parallel to one of said directions for casting upon said output-side pattern an exactly registering image of said input-side pattern as projected with different operating wavelengths of incident radiation in respective positions of adjustment of said dispersion means; photoelectric transducer means positioned to receive radiation transmitted by one multiplicity of zones of said output-side pattern, the rate of reception of radiant energy by said transducer means attaining an extreme value for an operating wavelength corresponding to a related position of adjustment while having finite other values for all other wavelengths projected with partial coincidence of said patterns; drive means for relatively vibrating said support and at least part of said projection system in the other of said directions between positions of exact and partial coincidence of said output-side pattern with the projected image of said input-side pattern whereby said rate of reception periodically reaches said extreme value in the presence of radiation of said corresponding operating wavelength; and circuit means connected to said transducer means for detecting a pulse corresponding to said extreme value in the output of said transducer means.

13. An apparatus as defined in claim 12 wherein said zones are bounded by substantially equilaterally hyperboloidal curves having a common axis and common asymptotes, the spacing of said curves varying progressively along said axis, the direction of relative vibration between said support and said projection system being substantially parallel to one of said asymptotes.

14. An apparatus as defined in claim 13 wherein each of said patterns extends over a generally rectangular area divided into quadrants, said hyperboloidal curves being duplicated in all of said quadrants in geometrically identical arrays symmetrical with reference to the center of the rectangle.

15. An apparatus as defined in claim 14 wherein the asymptotes of each array intersect substantially at a corner of the rectangle, the relative spacing of the curves of the array decreasing along a diagonal line inwardly from said corner.

16. An apparatus as defined in claim 12 wherein the zones of each pattern are bounded by curves whose spacing varies progressively from the center of the pattern outwardly along a line extending diagonally with reference to said directions but is substantially constant along lines parallel to said directions, said drive means being operable to vibrate the projected image of said input-side pattern relatively to said output-side pattern with an amplitude on the order of the narrowest separation of said curves as measured in said other of said direction.

17. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in two orthogonally related directions; a projection system for directing incident radiation, transmitted by the zones of one multiplicity of the input-side pattern, onto the output-side pattern of said gate means, said system including dispersion means optically effective and swingable in a plane parallel to one of said directions for casting upon said output-side pattern an exactly registering image of said input-side pattern as projected with different operating wavelengths of incident radiation in respective positions of adjustment of said dispersion means; photoelectric transducer means positioned to receive radiation transmitted by one multiplicity of zones of said output-side pattern, the rate of reception of radiant energy by said transducer means attaining an extreme value for an operating wavelength corresponding to a selected position of adjustment while having finite other values for all other wavelengths projected with partial coincidence of said patterns; first drive means for periodically scanning said operating wavelengths by oscillating said dispersion means in said plane; second drive means for relatively vibrating said support and at least part of said projection system in the other of said directions between positions of exact and partial coincidence of said output-side pattern with the projected image of said input-side pattern whereby said rate of reception periodically reaches said extreme value in the presence of radiation of any of said operating wavelengths; and circuit means connected to said transducer means for detecting a pulse corresponding to said extreme value in the output of said transducer means.

18. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in two orthogonally related directions; a projection system for directing incident radiation, transmitted by the zones of one multiplicity to the input-side pattern, onto the output-side pattern of said gate means, said system including dispersion means optically effective and swingable in a plane parallel to one of said directions for casting upon said output-side pattern an exactly registering image of said input-side pattern as projected with different operating wavelengths of incident radiation in respective positions of adjustment of said dispersion means; photoelectric transducer means positioned to receive radiation transmitted by one multiplicity of zones of said output-side pattern, the rate of reception of radiant energy by said transducer means attaining an extreme value for an operating wavelength corresponding to a selected position of adjustment while having finite other values for all other wavelengths projected with partial coincidence of said patterns; first drive means for periodically scanning said operating wavelengths by oscillating said dispersion means in said plane at a relatively slow rate; second drive means for relatively vibrating said support and at least part of said projection system in the other of said directions at a relatively fast rate between positions of exact and partial coincidence of said output-side pattern with the projected image of said input-side pattern whereby said rate of reception periodically reaches said extreme value in the presence of radiation of any of said operating wavelengths; and circuit means connected to said transducer means for detecting a pulse corresponding to said extreme value in the output of said transducer means.

19. An apparatus as defined in claim 18 wherein said relatively fast rate is on the order of one-thousand times said relatively slow rate.

20. An apparatus as defined in claim 18 wherein said circuit means comprises filter means for suppressing direct current and frequencies on the order of said relatively slow rate in the output of said transducer means.

21. An apparatus for the spectrometric analysis of a flux of radiation, comprising radiation-gate means with an input side and an output side each exhibiting a substantially planar pattern of adjoining zones alternately forming part of a first and a second multiplicity of zones, said radiation-gate means including a support for at least one of said patterns, the zones of said first multiplicity having a transmissivity for incident radiation different from that of the zones of said second multiplicity, said pattern being nonrepetitive in two orthogonally related directions; a projection system for directing incident radiation, transmitted by the zones of one multiplicity of the input-side pattern, onto the output-side pattern of said gate means, said system including dispersion means with a spectrum-spread plane parallel to one of said directions for casting upon said output-side pattern an exactly registering image of said input-side pattern as projected with a predetermined wavelength of incident radiation; photoelectric transducer means positioned to receive radiation transmitted by one multiplicity of zones of said output-side pattern, the rate of reception of radiant energy by said transducer means attaining an extreme value for said predetermined wavelength and having finite other values for all other wavelengths projected with partial coincidence of said patterns; drive means for periodically displacing the projected image of said input-side pattern relatively to said output-side pattern in the other of said directions between positions of exact and partial coincidence by relatively vibrating said support and at least part of said projection system whereby said rate of reception periodically reaches said extreme value in the presence of radiation of said predetermined wavelength; and circuit means connected to said transducer means for detecting a pulse corresponding to said extreme value in the output of said transducer means.

22. An apparatus as defined in claim 21 wherein said patterns are composed of centrally symmetrical sectors, the zones within each sector having widths which vary progressively from the center outwardly.

23. An apparatus as defined in claim 22 wherein said projection system includes auto-collimator means and reflector means for said radiation, said radiation-gate means comprising a single plate member divided into sections which form the zones of said input-side pattern on the side of said member facing away from said system and which form the zones of said output-side pattern on the side of said member turned toward said system.

No references cited.

JEWELL H. PEDERSEN, *Primary Examiner.*

B. LACOMIS, *Assistant Examiner.*